(12) United States Patent
Tuominen et al.

(10) Patent No.: US 7,256,250 B2
(45) Date of Patent: Aug. 14, 2007

(54) BIODEGRADABLE COATING

(75) Inventors: Jukka Tuominen, Espoo (FI); Janne Kylmä, Helsinki (FI); Jukka Seppälä, Helsinki (FI); Johan-Fredrik Selin, Helsinki (FI)

(73) Assignee: JVS-Polymers Oy, Espoo (FI)

( * ) Notice: Subject to any disclaimer, the term of this patent is extended or adjusted under 35 U.S.C. 154(b) by 0 days.

(21) Appl. No.: 10/492,555

(22) PCT Filed: Oct. 11, 2002

(86) PCT No.: PCT/FI02/00800

§ 371 (c)(1),
(2), (4) Date: Apr. 14, 2004

(87) PCT Pub. No.: WO03/033563

PCT Pub. Date: Apr. 24, 2003

(65) Prior Publication Data

US 2005/0080223 A1 Apr. 14, 2005

(30) Foreign Application Priority Data

Oct. 15, 2001 (FI) .................................. 20011999

(51) Int. Cl.
*C08G 63/02* (2006.01)
(52) U.S. Cl. .................. 528/272; 264/176.1; 264/219; 264/211.24; 528/176; 528/271

(58) Field of Classification Search ............. 264/176.1, 264/219, 211.24; 528/176, 271, 272
See application file for complete search history.

(56) References Cited

U.S. PATENT DOCUMENTS 4,888,413 A * 12/1989 Domb ....................... 424/78.17
2004/0143072 A1* 7/2004 Lewis et al. ................. 525/417

* cited by examiner

*Primary Examiner*—Terressa Boykin
(74) *Attorney, Agent, or Firm*—Kubovcik & Kubovcik

(57) ABSTRACT

The object of the present invention is a biodegradable polymer network and methods to make it. The polymer network consists of a cross-linked polyester resin, which is composed of hydroxy acid units, structural units derived from an unsaturated bifunctional monomer, and structural units derived from a polyol monomer. The polyester resin is produced directly by a polyoon-densation reaction, after which it is cross-linked to a polymer of high molecular weight The polyester can be co-polymerised with a co-monomer increasing flexibility, or be blended with a reactive macromonomer, which adds elasticity and crosslinking density. The prepared polymer network can be especially used to coat continuous or singular objects made of fibrous, porous, biomass based or inorganic materials, or as a blending component in these, or used to impregnate these in order to induce water durability, barrier properties, elasticity, coherence or mechanical strength.

25 Claims, 1 Drawing Sheet

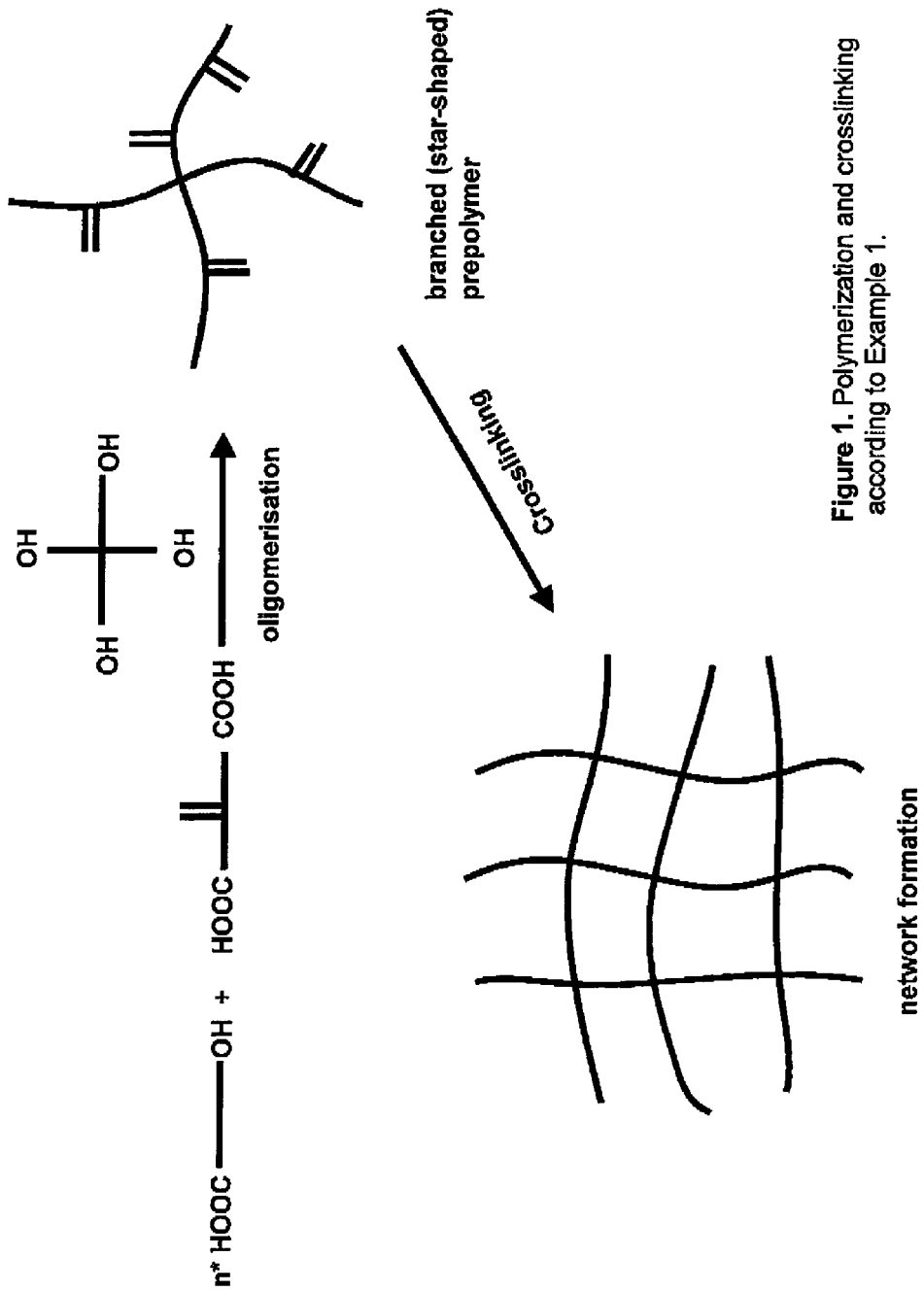
Figure 1. Polymerization and crosslinking according to Example 1.

BIODEGRADABLE COATING

The object of this invention is a biodegradable polymer network, which is made from hydroxy acids, an unsaturated bifunctional monomer and a polyol monomer, and a method for its manufacture.

With growing environmental problems the interest in biodegradable and compostable polymers has increased. Such polymers could be used for example in single use products, packages, as paper coatings and to wrap compostable refuse, whereby composting would be an alternative to recycling or incineration to deal with plastics waste. The high price of biodegradable plastics limits, however, their use in packages and other commodity and mass applications.

The markets for biodegradable polymers have grown during the last years and they will expand significantly in the coming years. The reason for growth is partly a growing awareness on the side of the consumer of the increase in landfill waste due to packaging, and partly the tightening legislation for recycling, and a concern for a decrease in the non-renewable oil resources used in the production of traditional polymers. The use of renewable natural resources is then a significant competitive advantage. Especially the lactic acid used as the raw-material for the lactic acid polymers is made from renewable natural resources; the carbon source used in the fermentation to lactic acid is starch or sugar, and often the use of by-products or wastes from agriculture is attempted. The itaconic acid monomer, as well as the 1,3-propane diol, used in the invention are also commercially produced by fermentation of renewable carbon sources.

Different coatings are used in huge quantities to coat paper, paper board, textiles, wood, metals and polymers. With the coating one strives to improve the product properties of the substrate, such as barrier properties, for example water or fat retention, and special durability properties, e.g. water strength. The coatings are usually composed of a viscous three-component system: a film forming binder, a pigment, and a volatile solvent. These coatings are used either as solutions or dispersions in the coating applications. The binders in most coatings are either high molecular weight non-reactive organic polymers, or low molecular eight reactive polymers, which are further polymerised to high molecular weight films in the coating process.

Biodegradable plastics are usually understood to be polymers that by the influence of microbes and moisture degrade to non-harmful low molecular weight compounds (mainly carbon dioxide and water). The biopolymers are usually divided into natural and synthetic polymers. To the group of natural polymers belong, i.al., proteins and polysaccharides (starch and cellulose based). Synthetic biopolymers are aliphatic polyesters, polyanhydrides, polyorthoesters, water soluble polyvinyl alcohols and some polyurethanes. Biopolymers can also be produced with the help of microbes (e.g. polyhydroxy alkanoates). The most important group of biodegradable plastics is composed of aliphatic polyesters, the biodegradation of which largely is based on hydrolysable ester bonds. Among the polyesters one can mention polyglycolide, polylactide, and polycaprolactone and the bacterially made polyhydroxy butyrate and valerate. The polyesters are usually prepared from hydroxy acids or diacids and diols. For the aliphatic polyesters to have adequate mechanical properties their molecular weights have to be fairly high. The most common means to achieve a high molecular weight is to prepare the polyester by a ring-opening polymerisation of lactones.

Lactic acid is one of the most potential raw materials for biodegradable commodity polymers. Lactic acid is produced from renewable natural materials (e.g. barley, potato, corn/maize) by fermentation. The polymers of lactic acid, or polylactides, are thermoplastic, biodegradable polyesters. Polylactides (PLA) can be processed with common plastic processing equipment, and they have good mechanical and barrier properties in package applications. PLA is rapidly and completely degraded in composting conditions to biomass, water and carbon dioxide. The fields of use for polylactides are single use utensils and cutlery, packages for food products and technical items, agricultural films and other gardening products, paper and paper board coating products and products in hygiene and public health. The polymers from lactic acid are also non-toxic, biocompatible materials, and they are used in many applications within orthopaedics, odontology, pharmacy and surgery (e.g. bone screws and sutures).

The condensation polymerisation between the hydroxyl and acid groups of lactic acid does not produce sufficiently high molecular weight polymers so that their mechanical properties would be adequate. In the manufacture three main routes are therefore used, all of which utilize condensation polymerisation, however. In the coupling polymerisation method for lactic acid the lactic acid monomers are first polycondensed to low molecular weight oligomers, which in the second stage are coupled to each other by the use of different coupling agents, such as di-isocyanates, di-epoxies or bis(2-oxazolines). These coupling methods are described, inter alia, in the patent publication U.S. Pat. No. 5,470,944. The increasing of the molecular weight by coupling reactions demands that the reactive end-groups of the lactic acid oligomers usually are the same (either hydroxyl or acid ends). This requirement can be achieved by using long polymerisation times and a low pressure in the condensation reactor, this markedly increases the manufacturing costs, however. In addition the amount of the by-product, lactide, increases and the yield of the lactic acid oligomer decreases when the polymerisation time is prolonged.

In the mostly used method cyclic dimers of lactic acid, lactides, are made from the oligomers, and these are polymerised by ring-opening polymerisation to polylactide. Production of polylactide by the ring-opening polymerisation mechanism via the lactide phase yields a high molecular weight polymer, but it requires many steps and extremely pure starting materials. Since Carothers showed this polymerisation method in 1932 several papers have been published to improve the polylactide process: (a) Methods for making the pre-polymers required for manufacture of lactide are shown, e.g., in US patent publication U.S. Pat. No. 5,357,034; (b) production of crude lactide is shown, inter alia, in U.S. Pat. No. 5,357,035; (c) purification of crude lactide to lactide in the patent publication WO9631506; (d) several types of polymerisation methods to polymerise lactide to polylactide are known, for example the one shown in the patent publication FI97065 1; and, (e) removal of residual monomer from polylactide is shown in the publication FI970649. In addition, the high temperatures required for processing of thermoplastic polylactide demand (f) thermal stabilisation, which has been shown in, inter alia, U.S. Pat. No. 5,338,822. These several steps (a-f) in the production of polylactide and their sub-processes require many different, often complicated and expensive process equipment, and the total yield of final polylactide from lactic acid further often tends to be relatively low.

In addition to the above mentioned methods a solvent process based on azeotropic distillation is shown in the US patent publication U.S. Pat. No. 5,310,865, in which method lactic acid is polycondensed directly to poly(lactic acid). Lactic acid is polymerised in the presence of a catalyst in some organic solvent, such as anisole or diphenyl ether. The organic solvent forms with water an azeotropic mix, by which water can be removed from the reaction, and thus the polycondensation equilibrium is pushed towards the polyester. In optimised conditions high (even 300 000 g/mol) molecular weights have been achieved. In the mentioned process solvents are used, however, the use of which, and their purification to the required level, and the separation of the final product from the solvents are economically unfavourable. Additionally relatively high catalyst concentrations have to be used in the process.

In addition to the above described manufacturing methods for thermoplastic polymers thermoset biodegradable polymers can be made. In the patent publication U.S. Pat. No. 4,502,976 the manufacture of a bioerodible water soluble hydrogel is shown by condensation of an unsaturated aliphatic or cyclo-aliphatic dicarboxylic acid or diol, a water soluble polyglycol and a dicarboxylic acid. The aim in the invention is for a medical hydrogel, which type of polymer is not suitable as a coating or barrier material because of its water solubility. In the US publication U.S. Pat. No. 4,843,112 a curable biodegradable bone cement is shown, a blend of poly(propylene glycol fumarate), ceramics and salts, manufacturing method by condensation and curing with methyl methacrylate. In the patent publication U.S. Pat. No. 4,888,413 is shown still for medical purposes a poly(propylene glycol fumarate) with a molecular weight of 500-3000 g/mol, whereas in the EP patent publication EP0812868A1 a crosslinked polyester based on an unsaturated multi-functional acid (poly(glycol fumarate)) with a molecular weight of more than 15 000 g/mol. Several other publications show methods in which compounds with double bonds are linked to known biodegradable polymers by addition, after which they are cured; for instance maleic acid anhydride has been linked to the hydroxyl end-groups of polycaprolactone. The weakness of these methods is the steps in the ring-opening polymerisation process and further the high demand of conversion on the following addition reaction, which add to the manufacturing costs. In the methods described above it has mainly been the aim to get medical materials compatible with (human) tissues, and priority has not been on the price of the raw-materials for the polymers, complicated reaction systems nor on their biotechnical means of production. The described patents are further not based on hydroxy acid monomers and do as such not correspond to the chemical composition in the present invention and the achieved properties. Additionally, the polyesterification reaction is often performed in an organic solvent adding to the costs of a high volume production. The weakness of the said materials for industrial high volume production, such as polymer production for making coatings and objects, is thus that they are not applicable due to their chemical composition, high costs of raw-materials, complicated production processes and their material properties.

The purpose of the present invention is to make from lactic acid a new type of a biodegradable polymeric network, which differs essentially by its material composition, its manufacture and use from earlier presented inventions.

The aim of the invention is also to produce the mentioned product by a method which is simpler than previous ones.

A further object is to eliminate from lactic acid polymers typical drawbacks, which especially is the bad heat tolerance and brittleness of the materials.

The purpose is, that in the manufacture of the polyester mainly starting materials based on renewable raw materials could be used.

An additional object is, that no by-product such as lactide is removed from the reaction vessel in the polycondensation reaction, thus improving the yield of the product.

Further the object is, that the product from the polyesterification has not to be purified from monomer residues or other impurities.

A further aim is, that by mixing into the polyester resin a reactive macromonomer it is possible to even more improve the properties of the product and its utility.

Now it has surprisingly been observed that these objects are fulfilled by the network polymer of the present invention as prepared by the methods described herein.

The polymer resin according to the invention is manufactured by polycondensation of a hydroxy acid, such as lactic acid, and a diacid with a double bond, such as itaconic acid or itaconic acid anhydride. In the polymerisation is further used a di- or polyfunctional alcohol. It is also possible to use other co-monomers in the polycondensation if different properties are desired for the product, such as elasticity. It is possible to add a reactive macromonomer to the prepared, still reactive, low molecular weight polyester resin before application. In the application to the substrate typical polymer coating and dispersion coating techniques may be used, such as engraved roll coating, spray coating or a layer formation by use of a set of rolls. Curing or crosslinking of the resin to a high molecular weight network polymer takes place by heat, uv or visible light or other irradiation. By using the thermoset biodegradable plastic being the object of this invention it is believed that wider temperature ranges and improved penetration properties can be achieved compared to thermoplastic biopolymer coatings. It is also possible to tailor the mechanical properties of the end-products from hard to flexible.

The polymer resin according to this invention can be processed and cured by using traditional processing methods for thermoset plastics. Processing at normal pressure include hand laying, spraying, continuous lamination, casting, rotational moulding and making of pipes and containers using a rotating mould. Methods based on compression are compression and transfer moulding (RTM), injection moulding (RIM) and pultrusion.

The new polymers have a wide field of applications. The polymer can be used as a coating on packages, sacks, bags and films made from paper, board, cellulose, starches and recycled fibres. Moulded products according to methods mentioned above and heat and blow moulded packages, sacks, bags and bottles can be produced from them. Further they can be used in the manufacture of expanded plastics products, cell plastics and foams, that can be used as cushioning in packages. They are also applicable as coatings or matrices for controlled release fertilizers, crop protection agents, insecticides and pharmaceutics.

The invention is based on the consideration that the polyester resin is hardened to a solid, thermoset type material by a crosslinking or curing reaction. Additionally the option prevails to add to the reaction mixture in the preparation stage a monomer containing a flexible main chain, such as a $\epsilon$-caprolactone monomer. The object of the caprolactone units are to induce flexibility to the material, to depress the glass transition temperature, and to act as an internal plasticiser decreasing the melt viscosity. Caprolactone is an advantageous co-monomer in the sense that it is biodegradable, and thus the biodegradablity of the end-product is maintained.

The process according to the invention is basically a two stage one, where the first stage comprises polymerisation of the resin, in which from lactic acid and itaconic acid either a linear or star shaped polyester with the desired molecular weight can be made in a reasonable time, keeping formation of side products low. The di- or multifunctional alcohol has an important role in tailoring the molecular weight and molecular structure. Central parameters in the method are the monomer ratios, polymerisation temperatures, the temperature increase profile, means to remove the water formed in condensation, co-monomers, and catalysts.

In the second stage of the method a network polyester with a high molecular weight is formed by crosslinking the resin using a radical forming compound such as a peroxide. Initiation of the resin is achieved by heat, light or by irradiation. Central elements at this stage are the mixing temperature, curing temperature, uv curing parameters, used crosslinking agents and their amount, accelerators, inhibitors and the technical solutions (heat, light and their combination).

When needed, it is possible to add to the prepared reactive polyester resin a reactive macromonomer before the curing step of the second process stage. As defined in the invention, the reactive macromonomer can be a small molecular weight polymer made from a hydroxy acid and possibly other co-monomers, itaconic acid and a polyol. By its use application can be eased by reducing the melt viscosity, the level of curing and the crosslink density can be influenced, and it can bring flexibility to the material.

The invention will be more closely looked at below with a detailed description and corresponding examples.

The first stage in the method of the invention comprises the condensation polymerisation of the resin. In the polymerisation it is prepared from (i) a hydroxy acid, (ii) an unsaturated bifunctional monomer, (iii) a functionalising agent (a diol or polyfunctional alcohol, a diacid or polyfunctional acid), and (iv) possibly other monomers, such as ε-caprolactone, a polyester with the desired molecular weight.

The hydroxy acid monomers used in the invention to prepare the resin are typically comprised of α-hydroxy acids, β-hydroxy acids or lactones. It is especially advantageous to use aliphatic or aromatic α-hydroxy acid monomers, such as L-lactic acid or D-lactic acid or their mixtures (e.g. racemic D,L-lactic acid), glycolic acid, 6-caproic acid, L- or D-mandelic acid, L,L-lactide or D,L-lactide. The hydroxy acid monomers may also be multifunctional. As examples malic acid and citric acid can be mentioned.

The unsaturated bifunctional monomers used in the invention typically are comprised of unsaturated bifunctional acids, such as itaconic acid, itaconic acid anhydride, maleic acid, maleic acid anhydride or fumaric acid, or of bifunctional unsaturated alcohols, such as 1,4-butenediol, 1-propene-1,2-diol, 2-heptene-1,7-diol, 3-heptene-1,7-diol, 2-hexane-1,6-diol, 3-hexane-1,6-diol, 1-pentene-1,5-diol or 2-pentene-1,5-diol.

Especially interesting is such an application of the invention in which the hydroxy acid and the unsaturated bifunctional monomer are based on renewable raw materials and can be manufactured by biotechnical means, such as L-lactic acid and itaconic acid.

The number of reactive groups and the amount of the functionalising agent used in the manufacture of the resin determine the molecular structure (e.g. linear or star shaped) and the molecule size (molar mass). The functionalising agent to be used is typically a polyfunctional alcohol, such as butanediol, glycol, propanediol, hexanediol, penta-erythritol, mannitol, glycerol or different polyglycerols, or a multifunctional acid, such as 1,1,3-propane carboxylic acid, 1,1,2-ethane carboxylic acid or 1,2,3,4-cyclo-pentane tetracarboxylic acid.

Depending on the amount of starting materials the composition of the polyester resin is typically 80-95 mole % lactic acid and 5-20 mole % itaconic acid and the functionalising agent. When a rubber-like ductility and elasticity is desired typically 1-99 mole % of a cyclic aliphatic lactone, e.g. ε-caprolactone, can be added. Correspondingly, when stiffness and high use temperatures are wanted, mandelic acid can be added. The mentioned percent amounts are calculated on the total monomer content.

Structurally star shaped resins can be prepared by using polyfunctional alcohols, such as pentaerythritol. Copolymerisation of pentaerythritol (PE), lactic acid (LA) and itaconic acid (IT) by a condensation reaction yields a polyester resin, which is composed of the following building units, however not excluding other possible structures:

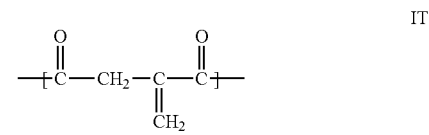
IT

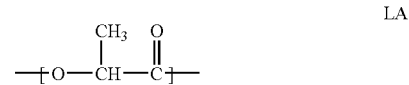
LA

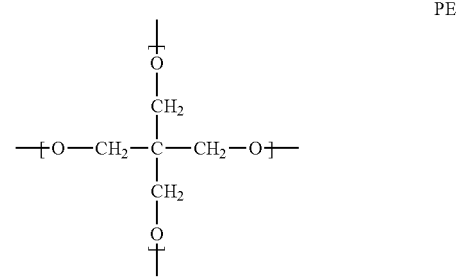
PE

Structurally star shaped, elastic resins can be prepared by copolymerisation of a multifunctional alcohol, such as pentaerythritol (PE), lactic acid (LA), itaconic acid (IT) and ε-caprolactone (CL) by a condensation reaction. A polyester resin composed of the following building units is then achieved, however not excluding other possible structures:

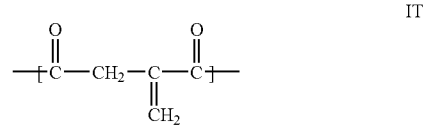
IT

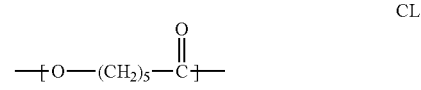
CL

-continued

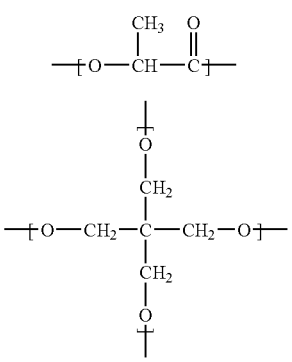

The properties of the resin can be adjusted by changing the monomer ratios. Molecular weight can be adjusted by changing the pentaerythritol—lactic acid ratio, and crosslinking density can be adjusted by changing the lactic acid—itaconic acid ratio. Additionally, also the elasticity of the resin, its degree of rubbery properties, can be adjusted by changing the resin composition i.e. altering the amount of caprolactone.

Structurally linear curable resins can be prepared by using difunctional alcohols, such as 1,4-butanediol (BD). Copolymerising it with lactic acid (LA), and itaconic acid (IT) in a condensation reaction yields a polyester resin, which is composed of the following structural elements, not excluding other possible structure, however:

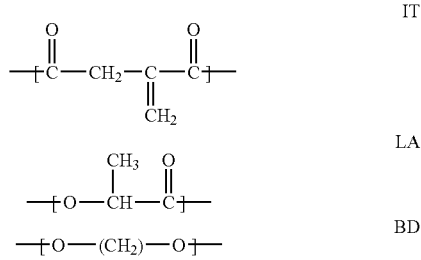

As above, the properties of the resin can be adjusted by changing the ratios of the monomers. Molecular weight can be tailored by changing the butanediol—lactic acid ratio, and the crosslink density can be adjusted by altering the lactic acid—itaconic acid ratio. Further, a part of the lactic acid can be replaced with caprolactone, whereby the resin will get added elasticity.

The polycondensation of lactic acid is an equilibrium reaction. In order for the polymerisation to proceed, the reaction equilibrium should be pushed to the side of the products. To move the equilibrium to the right, especially at the end of the reaction, is usually difficult, because the condensation water escapes extremely slowly when the viscosity increases. Shifting of the equilibrium is achieved by reducing the pressure, increasing the temperature and by the use of catalysts. When the polymerisation temperature exceeds 210° C., the breakdown of the polymer chains starts to limit the polymerisation rate. In addition, the molar mass of the poly(oactic acid) is decreased by depolymerisation, by which the harmful side-product lactide is formed, and its formation increases also substantially at temperatures above 220° C. Poly(lactic acid) with a high molecular weight is very cumbersome to prepare by polycondensation without solvents, special catalysts and long polymerisation times. The reaction is also very sensitive to monofunctional impurities, which can act as chain terminators. Thus condensation polymerisation of lactic acid usually is limited to making low molecular weight, typically 5,000-20,000 g/mole, polymers (also called lactic acid oligomers). The number average molecular weight of polyesters should be at least 25,000-40,000 g/mole for a product to have useful physical properties.

The advantages of the present invention can be regarded to be that it is not aimed at high molecular weights in polymerising the resin, the molecular weights are usually between 500 and 10,000 g/mole. Further, because the subsequent reactions are based on reaction of the double bonds and not free end-groups, it is considered that bringing the reactions of the end-groups of the monomers in the reaction mixture to an end is not critical for this process. Hereby remarkable process technical advances are achieved, such as shorter reaction times, lower polymerisation temperatures, and milder subpressure conditions. An advantage of the invention is also that no solvents are needed in the polymerisation. Further, according to the method for manufacture in the invention it is possible to decrease formation of the side product, lactide, due to the monomer composition and lower polymerisation temperatures. Still, because the curing reaction and the crosslink density depend primarily on opening of the double bonds, and not on the molecular weight of the prepolymer, or on defined exact stoichiometric ratios between end-groups, the method gives the possibility to use also "food grade" or less refined and purified lactic acid.

The polycondensation reaction is autocatalysed by the acid groups in the monomers. When the reaction proceeds the concentration of acid groups decreases, however, and the reaction slows down. To avoid this it is recommended to use a catalyst in polyesterifications, usually 0.1 . . . 0.5 weight %. In the polycondensation of lactic acid, for instance protonic acids, Lewis acids, organometallic compounds of titanium, tin, zirconium and lead, metal oxides and metal salts, may be used as catalysts.

During the polycondensation it is important to make sure that the double bonds do not polymerise with each other by a chain reaction and thus prematurely cure the polymer. Inhibitors added to the reaction mixture react with radicals to form inactive molecules. Thus a premature curing of the resin during the polycondensation reaction is blocked, and also the work time during application is prolonged. Due to the inhibitors it is further possible to extend the shelf life of the polyester resins by several months or even years. Most commonly used inhibitors are quinones (e.g. p-benzoquinone, hydroquinone and 1,4-naphthoquinone), aromatic nitro-compounds (tri-nitrobenzene), sulphur, metal halides and copper compounds. Especially good inhibitors are such compounds that do not contain hydroxyl groups that could react with the monomers of the reaction mixture. Such are p-benzoquinone, 1,4-naphthoquinone and 2,5-diphenyl-p-benzoquinone. The amount of inhibitors is typically 0.01 . . . 0.1 w-% of the resin.

Production of the resin, or the polycondensation polymerisation, can be made in any equipment that is fit for esterification reactions. According to one favourable alternative the polyesterification is carried out as a bulk polymerisation in the melt, whereby water formed as a condensation product can be removed by leading a dry inert gas into the polymer melt with simultaneous mixing. Abstraction of water can also be improved by using vacuum, whereby the pressure is decreased step-wise. According to one favourable alternative the polyesterification is started at a temperature of about 90° C., which is gradually increased to 180° C. The pressure is correspondingly step-wise decreased between 500 and 30 mbar, and the condensation water is continuously removed by nitrogen. At the end of the polyesterification the fraction with a low molecular weight can be removed from the reaction mixture, if it is desired, by decreasing the pressure further, whereby the aforementioned fraction is distilled off. The polyesterification is advantageously performed in the presence of a catalyst, whereby according to one favourable embodiment the used catalysts are typical polyesterification catalysts. Such catalysts are, e.g., salts, or alkyl or alkoxy compounds, of aluminium, iron, tin, or zinc.

A polyester resin prepared in the way as described above can further be blended with known fillers, reinforcements and thixotropic materials. Typical fillers and reinforcing agents are talcum, wollastonite, chalk, glass, quarts and silicates, wood flour, jute, hemp, cellulose, starch, cotton, flax, graphite, carbon black and different pigments such as titanium dioxide. The polyester resins run rather easily especially on vertical surfaces if they do not have thixotropic properties. The most common agent giving thixotrophy is a specially made silicon dioxide. Its effect depends on hydrogen bonds between the polyester resin and hydroxyl groups on the silicon. These hydrogen bonds increase the viscosity of the resin when the resin is not handled, and thus the running is diminished. Thixotropic additives make the cured resin slightly opaque.

Curing of the low molecular weight resin to a high molecular weight polymer changes, and usually improves, its physical properties compared to the uncured resin. The temperature range of the polymer is especially widened, and the barrier properties improve. The improved properties are especially seen above the glass transition temperature. Curing of the resin as described in the invention can be performed by forming from the resin a polymer film by any known film formation method and equipment, which is suitable for making a polymer film (extrusion, dispersion, spray coating), or by making a formed object using the earlier mentioned traditional processing methods for thermoset resins, such as compression and transfer moulding, RIM injection moulding and pultrusion. Alternatively can a film be made on the surface of a material to be coated, such as paper, board, wood, polymer, glass, metal or other material, by any known film formation method and equipment, which is suitable for making a polymer film on the surface of a material (extrusion, dispersion spray coating). The resin may be cured by heat, light, by irradiation or a combination of these in an apparatus adapted for this. The curing can take place immediately after film formation before application, or after application.

In the curing as described by the invention the reaction by the double bonds, or the crosslinking, is initiated by producing radicals in the resin using different radical forming compounds for example organic peroxy compounds, such as diazyl peroxides, peroxy esters, peroxy dicarbonates, monoperoxy carbonates, diperoxy ketals, dialkyl peroxides, sulfonyl peroxides, ketone peroxides, and, peroxy carboxylic acids. Examples could be dibenzoyl peroxide, di(2,4.dichlorobenzoyl)peroxide, di-t-butyl peroxide, diacetyl peroxide, dilauroyl peroxide, didekanoyl peroxide, di-isononanoyl peroxide, succinic acid peroxide, acetyl cyclohexanesulfonyl peroxide, m-chloroperbenzoic acid, tert-butyl perbenzoate, tert-amylperbenzoic acid, and tert-butylperoxy maleic acid. Further are inorganic peroxides to be used, e.g. hydrogen peroxide, oxygen, ozone, azo compounds, redox initiators, light initiators, polymeric peroxides, and other means to produce radicals and the combination of these. In the curing methods of this invention curing temperatures that can be used may be ambient or higher depending on the mechanisms of radical formation.

By the embodiment of this invention can the curing of the resin be speeded up and the curing temperature be decreased by adding accelerators before curing of the resin. Accelerators that can be used are, e.g., metal compounds, such as cobalt compounds, organic amines or other known accelerators. Accelerators, such as cobalt octoate and naphthenate, and amine accelerators can be used dissolved either in a suitable plasticiser or solvent or as such. A typical dosing is 0.015 . . . 0.06 w-% cobalt or other metal, and 0.1 . . . 0.4 w-% amine, depending on the degree of acceleration and the resin quality.

By the embodiment of the invention the reactions of the double bonds, or crosslinking sensitivity and rate, can be adjusted by the use of inhibitors already in the condensation polymerisation, or these can be added to the resin afterwards. Inhibitors react with the radicals forming inactive molecules. By this premature curing of the resin is hindered and the working time is prolonged. After the inhibitors are exhausted (or reacted with the radicals) polymerisation and curing of the resin commences.

By the embodiment of the present invention, in the manufacture of the network biodegradable polymer coating the polymer resin can be cured by reacting its double bonds between themselves, or as homopolymerisations, as described above. Additionally curing can be achieved also by using a reactive macromonomer together with the polymer resin, whereby the double bonds of the different compounds react forming the network crosslinked polymer. By using a reactive monomer, or reactive macromonomer, together with the polymer resin as according to the methods of this invention, the crosslink density can be affected, elastic, rubber like materials can be achieved, and the viscosity of the resin can be reduced. According to one favourable alternative the elasticity inducing reactive macromonomer is mixed with the described polyester resins. In the embodiment of the invention rather low molecular weight unsaturated polyester resins can be used as macromonomers. These structurally linear, elastic resins can be prepared by copolymerising difunctional alcohols, such as butanediol (BD), lactic acid (LA), itaconic acid (IT) and ε-caprolactone (CL) in a condensation reaction. Thereby a polyester resin is achieved, which is composed of the following structural units, however, not excluding other possible structures:

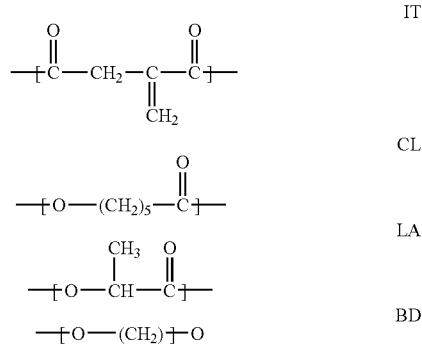

The present invention is described in more detail by the following examples.

EXAMPLE 1

Preparation of a Star Shaped poly(lactic acid—itaconic acid) resin

Into a 2 litre Rotavapor equipment used as the reactor was added 437.5 g L-lactic acid (88% water solution corresponding to 89 mole-%), 47.9 g itaconic acid (9 mol-%), 14.5 g pentaerythritol (2 mole-%) and 0.19 g tin(II) octoate. Dry nitrogen was led into the reactor and 500 mbar absolute pressure was established. The reactor vessel was partly immersed in an oil bath with a temperature of 90° C. The temperature of the oil bath was increased at a rate of 30° C./h to 120° C., and the reaction mixture was mixed by starting the rotation at a speed of 100 rpm. The temperature of the oil bath was evenly increased by 15° C./h until 180° C., where it was kept until the end of the polymerisation. The pressure was decreased every hour by the following steps: 500 (start)-500-450-400-350-290-190-140-90-60-50-40-30 mbar, at which pressure it was kept to the end of the polymerisation. Bubbling of nitrogen was continued throughout the polymerisation and the formed water was collected as it evolved. Total polymerisation time was 24 hours. During the polymerisation no lactide was formed on the reactor walls, condenser or receiver, although it typically forms in a condensation polymerisation of lactic acid.

The molecular weight of the obtained polymer was analysed with a SEC equipment (Size Exclusion Chromatography), and the number average molecular weight ($M_n$) was measured as 1500 g/mole, and the weight average molecular weight ($M_w$) as 3900 g/mole, compared with polystyrene standards, and thus the distribution coefficient was 2.6. DSC analysis (Differential Scanning Calorimetry) revealed, that the glass transition temperature was 33° C., and no crystalline melting point was seen, so the polymer was completely amorphous. By FTIR (Fourier Transform Infrared Speciroscopy) of the polyester resin both double bond (1640 $cm^{-1}$) and ester bond (1750 $cm^{-1}$) characteristic absorptions were seen.

EXAMPLE 2

Preparation of a Star Shaped poly(lactic acid—itaconic acid—ϵ-caprolactone) resin The polymerisation was performed like in Example 1, but the amount of the ingredients were 846.3 g aqueous L-lactic acid (86 mole-%), 66.2 g itaconic acid (6 mole-%), 67.4 g ϵ-caprolactone (6 mole-%), 20.1 g pentaerythritol (2 mole-%) and 0.39 g tin(II) octoate, and the polymerisation time was 26 hours.

$M_n$ of the obtained polymer was 2300 g/mole as measured by SEC, and its $M_w$ 7100 g/mole compared to polystyrene standards, and thus the molecular weight distribution was 3.1. DSC analysis revealed that the glass transition of the polymer was 26° C., and no melting point was seen. Both double bond (1640 $cm^{-1}$) and ester bond (1750 $cm^{-1}$) characteristic peaks were seen from the polyester resin by FTIR.

EXAMPLE 3

Preparation of a Star Shaped poly(lactic acid—itaconic acid—ϵ-caprolactone) resin The polymerisation was performed like in Example 1, but the amount of the ingredients were 794.7 g aqueous L-lactic acid (81 mole-%), 72.5 g itaconic acid (7 mole-%), 110.7 g ϵ-caprolactone (10 mole-%), 22.0 g pentaerythritol (2 mole-%) and 0.39 g tin(II) octoate, and the polymerisation time was 26 hours.

$M_n$ of the obtained polymer was 2800 g/mole as measured by SEC, and its $M_w$ 7600 g/mole compared to polystyrene standards, and thus the molecular weight distribution was 2.7. DSC analysis revealed that the glass transition of the polymer was 18° C., and no melting point was seen. Both double bond (1640 $cm^{-1}$) and ester bond (1750 $cm^{-1}$) characteristic peaks were seen from the polyester resin by FTIR.

EXAMPLE 4

Preparation of a Linear poly(lactic acid—itaconic acid) resin

The polymerisation was performed as in Example 1, but the amounts of ingredients were 401.0 g aqueous lactic acid (82 mole-%), 54.9 g itaconic acid (9 mole-%), 44.1 g 1,4-butanediol (9 mole-%) and 0.22 g tin(II) octoate, and the polymerisation time was 27 hours.

$M_n$ of the obtained polymer was 2100 g/mole as measured by SEC, and its $M_w$ 4100 g/mole compared to polystyrene standards, and thus the molecular weight distribution was 1.9. DSC analysis revealed that the glass transition of the polymer was 9° C., and no melting point was seen. Both double bond (1640 $cm^{-1}$) and ester bond (1750 $cm^{-1}$) characteristic peaks were seen from the polyester resin by FTIR.

EXAMPLE 5

Curing a Film by Heat

To the polyester resin of Example 1 was mixed 2 w-% di-tert-butyl peroxide (Trigonox B) in a melting mixer at 90° C. After two minutes of mixing the blend was compression moulded to 1 mm thick sheets using 90, 175 and 190° C. processing temperatures. The sheets were cured in a heating chamber at 125° C. for 1, 2 and 4 days, after 1 day a degree of crosslinking, or gel content, of 76%, (175° C. processing temperature) was achieved, the glass transition temperature of the material being 53° C.

EXAMPLE 6

Curing of a Film at 175° C.

To the polyester resin of Example 1 was mixed 2 w-% di-tert-butylperoxide (Trigonox B) in a melting mixer at 90° C. After two minutes of mixing the blend was compression moulded to 1 mm thick sheets (films) using 175° C. processing temperature and 1, 3, 6, 12, 30 and 60 min curing times, whereby 52, 71, 84, 80, 50 and 55% gel contents were obtained, correspondingly. The network polymer cured for 12 min had a modulus, tensile strength and elongation of 1200 MPa, 9 MPa and 20%, correspondingly.

EXAMPLE 7

Curing a Film Coated on Paperboard

To the polyester resin of Example 1 was mixed 2 w-% di-tert-butylperoxide (Trigonox B) in a melting mixer at 90° C. After two minutes of mixing the the paper board was coated with the PE 1 film and cured in a compression mould at 175° C. for 1, 3, 6 and 12 min. The coating film was clear and hard, and it markedly increased the wet strength of the board.

EXAMPLE 8

Curing a poly(lactic acid—itaconic acid—ε-caprolactone) Film by Heat

To the polyester resin of Example 3 was mixed 2 w-% di-tert-butylperoxide (Trigonox B) in a melting mixer at 90° C. After two minutes of mixing the blend was compression moulded to 1 mm thick sheets (films) using 90, 175 and 190° C. processing temperatures. The films were cured in a heating chamber at 125° C. for 1, 2, and 4 days, whereby gel contents of 57% (glass transition temperature ($T_g$) 23° C., compression at 175° C.), 51% (Tg 25° C., 175° C.) and 70% (175° C.) were obtained.

EXAMPLE 9

Curing a poly(lactic acid—itaconic acid—ε-caprolactone) Film at 175° C. Temperature To the polyester resin of Example 3 was mixed 2 w-% di-tert-butylperoxide (Trigonox B) in a melting mixer at 90° C. After two minutes of mixing the blend was compression moulded to 1 mm thick sheets (films) using 175° C. processing temperature and 1, 12 and 30 min curing times, whereby a gel content of 67% was achieved in 12 min. The polymer cured for 12 min had a modulus, tensile strength and elongation of 4 MPa, 1 MPa and 280%, respectively.

EXAMPLE 10

Curing of a poly(lactic acid—itaconic acid—ε-caprolactone) Film Coated on Paperboard To the polyester resin of Example 3 was mixed 2 w-% di-tert-butylperoxide (Trigonox B) in a melting mixer at 90° C. After two minutes of mixing the blend was coated on paperboard and cured in a compression mould at 175° C. for 1, 3, 6 and 12 min. The formed coating was clear, had a hard surface, and it hold for a bending comparable to creasing. The coating improved also the wet strength of the paperboard.

EXAMPLE 11

Curing of a Linear Prepolymer Film

To the polyester resin of Example 4 was mixed 1 w-% di-tert-butylperoxide in a melting mixer at 90° C. After two minutes of mixing the resin was cured in foil cups at 125° C. in an oven for 1, 4 and 6 days, when the corresponding gel contents were 11, 21 and 41%. The polymer was in the beginning clear and hard, but turned yellow with time. The glass transition temperature of the six day sample was 30° C.

EXAMPLE 12

Preparation of a Reactive Macromonomer

The polymerisation was performed as in Example 1, but the amounts of the ingredients were 55.7 g aqueous L-lactic acid (13 mole-%), 121.9 g itaconic acid (25 mole-%) 248.3 g ε-caprolactone (50 mole-%), 74.1 g 1,4-butanediol (13 mole-%) and 0.18 g tin(II) octoate, the polymerisation time being 26 hours.

Determined with the SEC apparatus a $M_n$ of 3000 g/mole and $M_w$ of 9200 g/mole, compared to polystyrene standards, were obtained for the polymer, and the molecular distribution was 3.1. DSC analysis gave a glass transition temperature of −49° C., and no melting point was seen.

EXAMPLE 13

Curing of a poly(lactic acid—itaconic acid) resin Using a Reactive Macromonomer

To the polyester resin of Example 1 20 w-% of the macromonomer of Example 12 was blended in a melting mixer at 90° C. for two minutes, after which 2 w-% di-tert-butylperoxide (Trigonox B) was added. After two minutes of mixing 1 mm thick films were compression moulded at 175° C. The films were cured at a 125° C. temperature for 1, 2 and 4 days, whereby 89% (1 day), 86% (2 days), and 91% (4 days) degrees of crosslinks were obtained. The glass transition temperatures of these network polymers were 33° C., 39° C. and 42° C., respectively.

EXAMPLE 14

Curing a poly(lactic acid—itaconic acid) resin Using a Reactive Macromonomer

To the polyester resin of Example 1 (80 w-%) was blended the macromonomer of Example 12 (20 w-%) in a melting mixer at 90° C. for two minutes, after which 2 w-% di-tert-butylperoxide (Trigonox B) was added. After two minutes of mixing 1 mm thick films were compression moulded at 175° C. The films were cured at 175° C. for 12 minutes, yielding a degree of crosslinking of 85%. The modulus, tensile strength and elongation of the cured film were 31 MPa, 6 MPa and 148%, respectively.

EXAMPLE 15

Use of the Reactive Macromonomer at Curing of a poly(lactic acid—itaconic acid) resin Paperboard Coating To the polyester 1 (80 w-%) was blended the raective macromonomer 1 (20 w-%) in a melting mixer at 90° C. for two minutes, after which 2 w-% di-tert-butylperoxide (Trigonox B) was added. After 2 min mixing a paperboard was coated with the polymer and cured in a compression mould at 175° C. for 1, 3, 6 and 12 min. The formed coatings were clear, with a hard surface and flexible.

The invention claimed is:

1. A biodegradable, curable structurally star shaped polyester resin composition, characterized in that the resin composition is based on
   (a) hydroxy acid units
   (b) structural units derived from unsaturated difunctional monomers (c) structural units derived from polyol monomers or polyacid monomers, the composition being the polycondensation product of 60 to 99.8 mole % of hydroxy acid monomers, 0.1-39 mole % of unsaturated difunctional monomers, and 0.1-15 mole % of polyol or polyacid monomers and being curable through double bonds.

2. A polyester resin composition according to claim 1, characterized in that its number average molecular weight is 200-50,000 g/mole.

3. A polyester resin composition according to claim 1, characterized in that the hydroxyacid monomers are composed of L-lactic acid monomers, D-lactic acid monomers, or their mixtures.

4. A polyester resin composition according to claim 1, characterized in that the unsaturated difunctional monomers are composed of itaconic acid, maleic acid, fumaric acid or their anhydrides, or 1,4-butenediol, 1-propene-1,2-diol, 2-heptene-1,7-diol, 3-heptene-1,7diol, 2-hexene-1,6-diol, 3-hexene-1,6-diol,1-pentene-1,5-diol or 2-pentene-1,5-diol.

5. A polyester resin composition according to claim 1, characterized in that the polyol monomers are composed off pentaerythritol, mannitol, glycerol, different polyglycerols, or glycol.

6. A polyester resin composition according to claim 1, characterized in that the polyacid monomers are composed of 1,1,3-propanetricarboxylic acid, 1,1,2-ethanecarboxylic acid or 1,2,3,4-cyclopentane-tetracarboxylic acid.

7. A polyester resin composition according to claim 1, characterized in that it is cured, or crosslinked, by radicals producing compounds, which are peroxides, azo compounds or redox compounds, or by heat, heat irradiation, UV irradiation, X-ray irradiation, gamma irradiation or electron irradiation.

8. A polyester resin according to claim 1, characterized in that the hydroxyacid monomers are composed of (A) L-lactic acid monomers, D-lactic acid monomers or their mixtures and (B) ε-caprolactone.

9. A polyester resin according to claim 8, characterized in that the hydroxyacid part is composed of 99-1 mole-% of component A and 1-99 mole-% of component B.

10. A polyester resin composition according to claim 1, characterized in that it has been blended with a reactive macromonomer.

11. A polyester resin composition according to claim 10, characterized in that the reactive macromonomer is composed of hydroxy acid monomers, unsaturated difunctional monomers and polyol or polyacid monomers.

12. A polyester resin composition according to claim 1, characterized in that it has been blended with fillers and reinforcing materials.

13. A method for manufacture of a biodegradable network polyester resin, characterized in that
in the first stage a polyester resin is formed by condensation reaction of 60 to 99.8 mole % of hydroxyacids, 0.1-39 mole % of unsaturated difunctional monomers and 0.1-15 mole % of polyol monomers and/or polyacid monomers, so that unreacted double bonds are left
in the second stage the polyester resin is cured to a high molecular weight network polymer through reactions of these double bonds.

14. A method according to claim 13, characterized in that the polyester resin is prepared by a melt polymerisation.

15. A method according to claim 13, characterized in that the curing, or crosslinking, is accomplished by radicals producing chemical compounds, which are peroxides, azo compounds or redox compounds, or by heat, heat irradiation, UV irradiation, X-ray irradiation, gamma irradiation or electron irradiation.

16. A method according to claim 13, characterized in that with its help the polyester resin is spread as a coating, spread by a spraying technique as a liquid, spread by extrusion, pigment, hotmelt or wax coating techniques, spread by painting techniques, or that it is moulded to objects, all of these later to be cured to network materials.

17. A polyester resin composition according to claim 1, characterized in that it is composed of 80 to 95 mole % lactic acid and 5 to 20 mole % itaconic acid and a functionalising agent.

18. A polyester resin composition according to claim 2, characterized in that its number average molecular weight is 200-15,000 g/mole.

19. A polyester resin composition according to claim 5, characterized in that the polyol monomers are composed of pentaerythritol, mannitol, glycerol or different polyglycerols.

20. A polyester resin composition according to claim 10, characterized in that the reactive macromonomer is a linear, oligomeric compound.

21. A polyester resin composition according to claim 1, characterized in that it is the polycondensation product of 60 to 99.8 mole % lactic acid, 0.1-39 mole % itaconic acid, and 0.1-15 mole % of pentaerythritol.

22. A polyester resin composition according to claim 21, characterized in that it is the polycondensation product of 89 mole % lactic acid, 9 mole % itaconic acid, and 2 mole % of pentaerythritol.

23. A polyester resin composition according to claim 1, characterized in that it is the polycondensation product of 60 to 99.8 mole % lactic acid and ε-caprolactone, 0.1-39 mole % itaconic acid, and 0.1-15 mole % of pentaerythritol.

24. A polyester resin composition according to claim 23, characterized in that it is the polycondensation product of 86 mole % lactic acid, 6 mole % ε-caprolactone, 6 mole % itaconic acid, and 2 mole % of peritaerythritol.

25. A polyester resin composition according to claim 23, characterized in that it is the polycondensation product of 81 mole % lactic acid, 10 mole ε-caprolactone, 7 mole % itaconic acid, and 2 mole % of pentaerythritol.

* * * * *